ABSTRACT OF THE DISCLOSURE

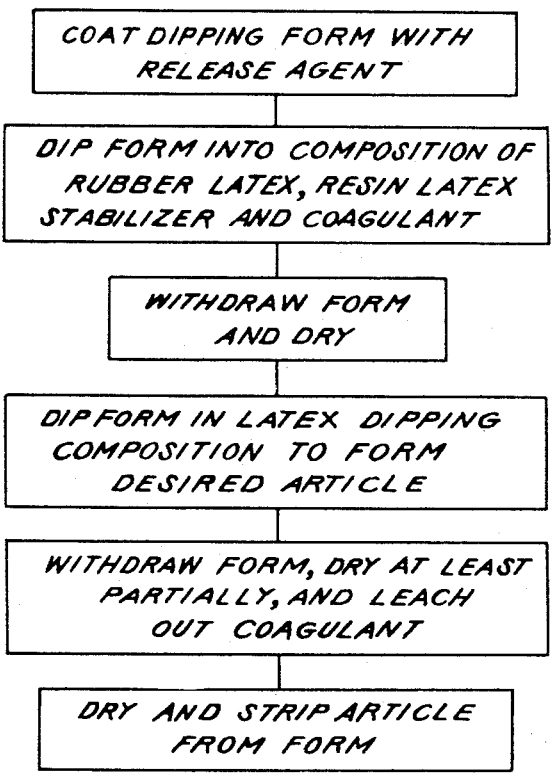
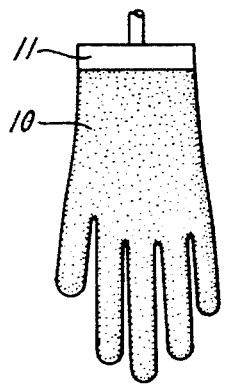
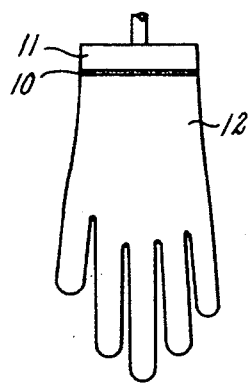
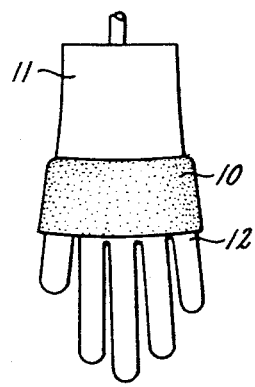
INVENTORS
JOHN J. KAVALIR
EVERETT V. ANDERSON
BY *James J. Long*
AGENT 3,411,982
ELASTOMERIC ARTICLE HAVING A
SLIP COATING
John J. Kavalir, St. Eustache sur le Lac, Quebec Canada,
and Everett V. Anderson, Bethany, Conn., assignors to
Uniroyal, Inc., a corporation of New Jersey
Original application Mar. 18, 1964, Ser. No. 352,988, now
Patent No. 3,286,011, dated Nov. 15, 1966. Divided and
this application June 7, 1966, Ser. No. 555,850
1 Claim. (Cl. 161—242)

A latex dipped article such as a glove or girdle, having an adherent slip finish layer which is a blend of an elastomer and an alkyl acrylate resin.

This application is a division of our copending application Ser. No. 352,988, filed Mar. 18, 1964, now U.S. Patent 3,286,011 issued Nov. 15, 1966.

This invention relates to a latex dipped article having a slippery surface that facilitates donning and doffing, such slippery surface being provided by a mixture of rubber (elastomer) latex and a latex or aqueous dispersion of a resin.

It has previously been proposed to provide slip finishes on dipped elastomer (rubber) articles such as rubber gloves or girdles by various methods. For example, the surface of a rubber glove can be halogenated with bromine or chlorine to make it slippery. However, this treatment can result in very poor aging properties. Discoloration can start almost immediately and within a month the halogenated surface film may become hard and brittle and brown in color. This can be avoided only by taking great care in the halogenation process and even then there is no assurance of obtaining a uniform, sustained slip film. Waxes and silicones have been used but this provides only a temporary solution as these materials rub off in a very short time (after not more than 3–5 wearings).

The present invention provides an excellent slip finish in the form of a lower cost compound having other desirable features as well. The invention is based on a novel method of providing a permanent "slip" on any natural or synthetic rubber (elastomer) latex dipped film. This slip finish provides a pleasing, glossy appearance and is not washed away with repeated use, nor is the film affected by aging.

The invention will be described with reference to the accompanying drawing, wherein:

FIG. 1 is a flow diagram representing successive steps in a typical practice of the invention;

FIG. 2 shows a dipping form for making a rubber glove, the form being coated with a slip finish composition of mixed rubber latex, resin latex, stabilizer and coagulant;

FIG. 3 shows the form after dipping in rubber latex to form a glove; and,

FIG. 4 shows the glove being stripped from the form with the slip finish coating adhered to the inside of the glove.

The invention involves the use of a composition comprising elastomer (rubber) latex and a latex or dispersion of a resin. The mixed latex composition contains from about 20 to 80% rubber solids and correspondingly from about 80 to 20% resin solids by weight based on the total weight of rubber and resin (preferably from about 50 to 60% rubber and from about 50 to 40% resin). Such a composition has been found to be capable of providing, on the surface of various rubber articles, the desirable slippery finish while still providing the desired durability, the stretchability required by the particular article, and other qualities, without suffering the disadvantages of previously known slip finishes.

The rubber latex suitable for use in the non-slip skin or coating may be a natural rubber latex or a synthetic latex. Such latex may be referred to generically as diene polymer rubber latex, in which category are included such natural and synthetic elastomers as polyisoprene (preferably cis-polyisoprene), polybutadiene, polychloroprene (neoprene), copolymers of dienes with copolymerizable monomers, e.g., copolymers of butadiene or the like with styrene, acrylonitrile, methyl methacrylate, etc., isoprene-isobutylene copolymer (butyl rubber), ethylene-propylene-diene (dicyclopentadiene, hexadiene, cyclooctadiene, or the like) copolymer, or any other natural or artificial rubber latex suitable for making dipped articles. Natural rubber latex is preferred. Next in preference are polychloroprene, cis-polyisoprene, butadiene-styrene (SBR) latex, or mixtures thereof.

As indicated, for use in the invention the rubber latex is mixed with a latex or dispersion of a resin. The resins as used provide a reduced coefficient of friction (which may be determined by a test to be described below) and although in themselves the resin films do not have appreciable elongation, it is found that when mixed with rubber latex in the proportions stated, elongation values of at least about 200%, preferably about 700%, are provided so that the stretchability required in the particular article is obtainable. The resins are of course employed in the form of stable aqueous dispersions which can be mixed, in the presence of stabilizers, with the rubber latex without causing coagulation or precipitation of either the rubber or the resin.

Among the resins particularly suitable for use in the invention there may be mentioned the acrylic-type resins, especially acrylic ester polymer resins, such as methyl acrylate and methacrylate, ethyl acrylate or methacrylate, butyl acrylate, and the like, or copolymers of such acrylates with each other and/or with other monomers such as styrene, acrylonitrile, acrylic acid, methacrylic acid, or the like, or mixtures of such resins.

Also suitable are vinyl acetate polymers such as polyvinyl acetate or copolymers of vinyl acetate with other monomers such as vinyl chloride, vinylidene chloride, styrene, or the like.

Another suitable resin is polyethylene.

Polyvinyl acetals such as polyvinyl formal, polyvinyl butyral, and the like may also be used.

Polyvinyl chloride or copolymers of vinyl chloride may also be used in the invention.

Styrene-acrylonitrile resins may be used.

High styrene-butadiene copolymer resin (e.g., 50–80% styrene) may be employed.

The slippery-surface composition based on the mixed dispersion of rubber and resin in accordance with the invention may be employed in making gloves, girdles or other dipped articles in various ways. In general, the article is made in part from a conventional rubber latex dipping composition, and the rubber-resin slip composition of the invention is employed only on the surface, usually only one surface of the article, for example, the interior of a glove or the exterior of a girdle (the interior surface of the girdle usualy being flocked). In the invention advantage is taken of the remarkably good adhesion between the slip composition of the invention and the underlying rubber article. The composite glove or the like made in accordance with this form of the invention usually has at least about half of its thickness, and more typically about 80 or 90% or even more of its thickness, made up of the conventional rubber latex dip, while the remainder of the thickness (most frequently about 10% of the total thickness) is made up of the mixed rubber-resin dispersion slip coating or skin coat of the invention.

Thus, such a composite glove bearing the slip composition of the invention on its inside surface may be made in various ways. In one form of the invention, the glove body or substrate may be formed first on the dipping form in the conventional way, and then, after removing the coagulant, the glove body, still on the form, may be dipped in the mixed resin-rubber latex slip finish composition and thereafter dried. If pre-cured latex has been used, this drying may be all that is necessary, but if the latex used was not pre-cured, then the dried glove is thereafter further heated to cure the latex. Another way of practicing the invention to make the composite glove is to apply the slip finish composition first, and thereafter form the rubber substrate over the slip coating. In this form of the invention the mixed resin-rubber latex is first stabilized by the addition of a conventional stabilizer, and then a conventional coagulant is added. The coagulant of course does not cause the slip composition to coagulate (since the latter is adequately stabilized) but instead the purpose of the coagulant is to coagulate the subsequently applied latex, as will appear hereinafter. The glove form is dipped in the slip composition, then dried. The form, bearing the dried film of slip composition containing the coagulant, is then dipped in the conventional rubber latex dipping bath to form the substrate or body of the glove on top of the slip film (by diffusion of the coagulant). The deposit is then washed in water, dried and cured, after which the resulting composite glove is stripped from the form.

Any suitable conventional latex dipping compound may be used for forming the base or substrate of the glove. The latex may be pre-cured, or non-pre-cured latex may be used, in which case the glove is cured after forming. The latex dip may contain conventional compounding ingredients commonly used in this work. A specific example is as follows:

Latex dipping compound for body of glove or other substrate using natural rubber Ingredients: Parts by weight (dry basis)
- Natural rubber (as latex) _____ 100.00
- Potassium hydroxide _____ 0.10
- Stabilizer (e.g., anionic surfactant, such as isopropyl naphthyl sodium sulfonate) ____ 0.35
- Formaldehyde (37%) _____ 2.90
- Zinc diethyldithiocarbamate _____ 0.10
- Sulfur _____ 0.40
- Zinc salt of mercaptobenzothiazole _____ 0.50
- Zinc oxide _____ 0.10
- Clay _____ 10.00
- Symmetrical dibeta naphthyl-p-phenylene diamine _____ 1.00
- Carbon black _____ 1.00
- Water (to total solids 58.0%).

The above compound may be pre-cured overnight (16 hours) at 55–60° C.

An example of a mixed rubber-resin slippery surface composition of the invention is that based on the following:

Part I (rubber latex part)

Ingredients: Parts by weight
- Natural rubber (as latex) _____ 100.00
- Potassium hydroxide _____ 0.10
- Stabilizer (e.g., nonionic surfactant such as the reaction product of ethylene oxide and oleyl alcohol) _____ 0.20
- Sulfur _____ 0.20
- Zinc oxide _____ 0.20
- Zinc dibutyldithiocarbamate _____ 0.15
- Water (to total solids 55.0%).

Part I may be pre-cured overnight at 55–60° C. (If the latex is not pre-cured, the glove after forming may be subjected to curing condition to bring about cure.) The following final mix is then made:

| Ingredients | Parts by Weight | |
| --- | --- | --- |
| | Dry Basis | Wet Basis |
| Part I | 55.0 | 100.0 |
| Resin latex | 45.0 | 100.0 |
| Water | | (¹) |

¹ To make 15% total solids.

Examples of resin latex that may be used are:

Resin latex A–1.—Aqueous dispersion of a copolymer of methyl methacrylate, ethyl acrylate, and methacrylic acid, approximately 46% total solids, pH 9 to 9.5, usually on a nonionic emulsifying system, such as that described in U.S. Patent 2,795,564 issued to Conn et al. on June 11, 1957 (e.g. in Example 1 or the other examples of that patent), as represented by such commercial preparations as Rhoplex B–60–A. Rhoplex B–85 (anionic system, 38% total solids, pH 9.5–10, hereinafter referred to as Resin latex A–2) or mixed preparations of this kind such as mixtures of Rhoplex AC–55 (anionic system, 50% solids, pH 9–9.5, hereinafter referred to as Resin latex A–3) with Rhoplex B–85.

Resin latex B.—Vinyl acetate polymer, such as a copolymer of vinyl acetate with methyl methacrylate, ethyl acrylate, or the like, as represented by such commercial preparations as Gelva 925 which has about 46% total solids, pH 5.5. In using polyvinyl acetate latices, ammonia is usually added to raise the pH before blending with the rubber compound.

Resin latex C.—Polyethylene, such as the commercial preparation Poly-Em 11, 40–41% solids on an anionic emulsifying system.

Resin latex D.—An aqueous dispersion of polyvinyl butyral (e.g., the commercial preparation Spraylat RD–365–D, about 50% total solids, pH 8.0–9.0, dispersed on an anionic emulsifying agent).

Resin latex E.—Polyvinyl chloride latex (e.g., Marvinol MX–5402, total solids 35%, anionic emulsifying agent, specific viscosity of the polyvinyl chloride resin 0.36).

An example of a specific procedure, where the slip finish dip is applied after the latex object is made, is as follows:

(1) Dip mold or form in coagulant solution (e.g., 25% calcium nitrate tetrahydrate dissolved in denatured alcohol) containing in suspension a mold release powder (e.g., 5% talc).

(2) Dry out solvent in coagulant solution on the form.

(3) Immerse form (covered with dried coagulant) in the natural rubber latex dipping compound exemplified above (pre-cured) and allow it to dwell as long as is necessary to provide the necessary film thickness (e.g. 2–3 minutes to make a thickness of 0.010–0.015 inch).

(4) Remove coated form from the latex.

(5) Allow to stand to fix the surface of the depositioned rubber film. This may take from 2 to 10 minutes depending on film thickness and the stability of the latex dipping compound.

(6) Immerse the dipped form in hot water (150° F.) for 10 or 30 minutes to leach out all of the calcium nitrate coagulant.

(7) Remove the form from the leach water and immerse immediately in the slip finish resin-rubber latex (pre-cured) compound exemplified above (viscosity 10–20 cps.).

(8) Remove form from the slip finish compound.

(9) Allow this coating or dip to dry for 5 to 10 minutes (note that the slip finish is not coagulated, it is merely allowed to dry).

(10) Place the dipped form in an oven at 190–200° F. for 15–25 minutes, in order to dry completely the film which has been deposited on the form. (If a non-pre-cured latex is used, then the drying is first carried out to avoid blistering, and thereafter the film may be cured at higher temperatures [e.g., 212° to 250° F. for 30 to 90 minutes].)

(11) Remove the dipped form from the oven and dust the film which has been deposited with talc or some other suitable powder and strip it from the form.

(12) The finished article may be turned inside out depending on which side the slip finish is desired.

An example of another specific procedure, in which the slip dip is made prior to dipping the form in the rubber dipping compound, is as follows:

(1) Add to the slip dip rubber-resin compound exemplified above the required amount of the coagulant, such as 50 parts by weight (wet) of a 50% aqueous calcium nitrate solution per 100 parts (dry) of slip compound. The slip dip compound is stabilized, for example, by the addition of a conventional nonionic surfactant (e.g., 2–5 parts of ethylene oxide-oleyl alcohol reaction product; iso-octyl phenyl polyethoxy ethanol and nonyl phenoxy poly [ethylene oxy] ethanol are other examples) prior to the addition of calcium nitrate. The rubber-resin solids usually amount to 5–15% by weight of this dipping solution; 10% is usually an optimum level.

(2) Dip the form in a mixture made from talc or some other powder in alcohol or acetone, in order to provide a release coating on the dipping form. Let the solvent evaporate before continuing the dipping.

(3) Immerse the form in the slip dip compound made according to No. 1.

(4) Remove form immediately but slowly from this modified slip dip compound.

(5) Allow the film to dry to provide a skin. Referring to the drawing, and particularly to FIG. 2 thereof, such a skin or slip coating 10 is there shown applied to a glove form 11.

(6) Dip the coated form in the latex dipping compound exemplified above and allow it to dwell from 20 seconds to 5 minutes in order to get a deposit of the required thickness (e.g. about 0.020 inch in 2 minutes).

(7) Remove the form and allow the dipped film 12 (FIG. 3) (consisting of the rubber latex body 12, with the slip coating 10 adhered to the inner surface thereof) to dry only long enough to coaugulate all of the liquid latex.

(8) Leach for 10 to 30 minutes in hot water (150° F.) in order to remove all the calcium nitrate coagulant.

(9) Dry or cure the glove in a hot air oven at 190–200° F.

(10) Strip the article (consisting of the rubber latex body 12, with the slip coating 10 adhered to the inner surface thereof) from the dipping form 11, as shown in FIG. 4.

The slip finish composition of the invention, especially in the described preferred form, makes it possible to achieve the following desirable features:

(a) It is hard enough to provide a slip in contact with the human skin.

(b) It is capable of taking 200–700% elongation, so that it is not only suitable for making articles which require little elongation, but it can also satisfy the needs of articles requiring relatively high elongation, such as gloves.

(c) It does not discolor and it has excellent aging properties when the preferred resins are used.

(d) It is permanent.

(e) It is applied from an aqueous system. This eliminates fire hazard and costly solvents.

(f) It provides good adhesion of the resin component to the substrate.

(g) The slip finish decreases water absorption, so that the latex article does not tend to become cloudy when exposed to water.

It is desired to emphasize that resin alone is not capable of providing all of these properties, particularly the elongation. Indeed, some acrylic latex films cannot be stretched at all. The invention provides a way of compounding such a resin latex in a way to enable the film deposited on a natural or synthetic latex film, to be elongated 200–700% for example without affecting the desired slip properties. This is done in accordance with the invention by adding to the acrylic or other resin latex, a rubber latex that is sufficiently compatible to give the required elongation without breaking prematurely.

It was remarkable to find that a resin such as acrylic resin latex compounded with rubber latex in the proportions described gave the desired film properties. By mixing the resin dispersion with rubber latex the invention provides a film which does not exhibit the stiff, horny characteristics of the resin but rather can approach the elongation characteristics of rubber, while at the same time providing an intrinsic bond between the film and the rubber base.

The present formulation of resin and rubber latices as employed in this invention is stable against coagulation by calcium chloride or calcium nitrate or other similar coagulants known to the art of latex dipped goods.

In this invention, as soon as the glove or the like is stripped from the mold, no further treatment is required and the glove is ready for packaging. The glove has been given an excellent, permanent and non-discoloring slippery film on the inside of the glove, without risk of spoiling the glove by halogenation.

The invention avoids the use of such expensive materials as silicones and does not require the use of expensive and hazardous solvents. No prior milling or solvating of the compound is necessary.

The use of pre-cured latex as described has the further advantage of making unnecessary any separate curing operation on the glove. Preferred resins are the acrylic ester polymer resins; next in preference are the polyvinyl acetate copolymers, on the basis of the composite properties of coefficient of friction drop, film gloss. It is desired to make particular reference to the thermoplastic resins having a softening temperature of at least about 110° F.

A useful way to evaluate resins involves preparing test films by dipping aluminum plates. A base film of the above-described latex glove compound may first be dipped and the skin-coat to be tested dipped over it. The procedure used may be as follows:

(1) Test plate dipped in latex glove compound, withdrawn and coagulated in 20% calcium nitrate in alcohol.

(2) After allowing the coagulant to surface dry from the rubber film, the plate is again dipped in the latex glove compound and allowed to dwell two minutes to build up the deposit. The plate is again withdrawn and coagulated.

(3) The plate is then immersed in hot water (60–70° C.) for 10 minutes to leach.

(4) After withdrawal from the leach, the rubber is allowed to surface dry and is then immersed in the skin-coat compound (ratio of resin solids to rubber solids 45/55) and slowly withdrawn.

(5) Plate placed in an air oven at 190–200° F. for 30 minutes to dry and cure.

The skin-coat compound films may then be rated for the following properties.

(1) Coefficient of friction
(2) Film gloss

The coefficient of friction may be measured by attaching a section of film to the bottom of a steel "sled" (2½" x 2½" x ¼") and pulling horizontally over a polytetrafluoroethylene surface. The ratio of force required to pull the sled to the weight of the sled may be taken as a coefficient of friction (Coeff. friction=$F/W$). Other surfaces (glass, steel, etc.) may be investigated in connection with this test but polytetrafluoroethylene is found to give the most reproducible results. Coefficient of friction ratings are as follows (the various resin latices are described in detail above):

Resin: Coefficient of friction
- Control—No resin _____ .574
- Resin latex A-3 _____ .293
- Resin latex A-1 _____ .293
- Resin latex B _____ .268
- Resin latex D _____ .268
- Resin latex E _____ .242
- Resin latex C _____ .242
- Resin latex A-2 _____ .217

In general compositions having a coefficient of friction of .4 or less, preferably .3 or less, are employed in the invention.

Film gloss may be determined visually by noting the amount of light reflected by the films. The ratings as to gloss, of the composite rubber-resin slip finish films made with various resins, are as follows:

- Highest gloss _____ Resin latex A-1.
- Good gloss _____ Resin latex A-3.
  Resin latex B.
- Fair gloss _____ Resin latex A-2.
- Poor gloss _____ Resin latex D.
  Resin latex C.
  Resin latex E.
- No gloss _____ Control (no resin).

An important embodiment of the invention that deserves special mention is a dipped girdle, having a flocked inner surface (which inherently provides desirable slip qualities as well as the ability to absorb moisture so as to avoid discomfort and irritation) and having the slip coating of the invention on its outer surface to avoid any undesirable tendency for garments to cling to the girdle. This form of the invention is suitably practiced by first dipping the girdle form in the mixed rubber-resin latices (suitably stabilized) containing the coagulant, thereafter dipping in rubber latex sensitive to the coagulant to form the girdle body, and thereafter flocking the exterior surface in the conventional manner (which exterior surface becomes the inner surface of the girdle when removed from the form).

It is desired to emphasize that the invention may be practiced not only with natural rubber but with any conventional latex suitable for dipping operations as indicated previously. Of the various natural and synthetic latices, natural rubber, polychloroprene rubber, synthetic poly isoprene, SBR, and mixtures thereof may be mentioned as the preferred group. Those skilled in the art will readily be able to vary the formulations and conditions of cure to suit the particular latex being used, as well as the particular final article desired. Likewise, the selection of the particular resin latex, or latices, for example from the variety of resins described in detail above or from any similar or equivalent resins, as well as the ratio of such resin to the rubber, can be made by the person skilled in the art in accordance with the directions given above, depending on the desired end use. It may be pointed out that the rubber which forms the substrate or base of the article will in general be the same as the rubber in the blended skin-coat latices, for optimum adhesion. As previously pointed out, the preferred resins are the acrylate types, of which special mention may be made of the class referred to in U.S. Patent 2,795,564, many of which may be described as interpolymers of one or more acrylic-type acids such as acrylic or methacrylic acid, with one or more acrylic esters such as methyl acrylate, ethyl acrylate, butyl acrylate, etc., and/or one or more methacrylic esters such as methyl methacrylate, ethyl methacrylate, butyl methacrylate, etc. For the sake of convenience and brevity such polymers may be referred to as copolymers of alkyl acrylates or methacrylates with acrylic or methacrylic acids. From these and the other thermoplastic resin latices mentioned above selection may be made depending on the properties dictated by the intended end use, as discussed in detail above. A preferred grouping of resins may be described as alkyl acrylate resins (in which category we include the preferred interpolymers just described), vinyl acetate polymers, polyethylene, polyvinyl acetals, vinyl chloride polymers, styrene-acrylonitrile copolymers, and resinous styrene-butadiene copolymers.

It will be understood that the stabilizers or surfactants specifically mentioned above are merely representative of any of a large number of equivalent conventional stabilizers that may be used in the invention, especially the conventional nonionic and anionic surfactants. Similarly, the coagulants mentioned are merely intended to be non-limiting examples of the numerous conventional coagulants which may be substituted in the invention, notably the polyvalent metal (calcium, magnesium, aluminum, etc.) salts (nitrates, chlorides, sulfates, etc.), as well as the acids (e.g. acetic, formic, lactic, etc.).

Having thus described our invention, what we claim and desire to protect by Letters Patent is:

1. A dipped material rubber latex shaped article having on its surface an adherent slip finish coating of lower coefficient of friction than the body of the article itself, said coating comprising a blend of from 50 to 60% by weight of an elastomer and correspondingly from 50 to 40% by weight of a resin, the said resin being a copolymer of methyl methacrylate, ethyl acrylate, and methacrylic acid.

References Cited
UNITED STATES PATENTS

| | | | |
|---|---|---|---|
| 2,747,229 | 5/1956 | Teague | 264—306 X |
| 2,789,933 | 4/1957 | Bargmeyer | 161—242 X |
| 2,959,821 | 10/1960 | Kolb | 264—306 |
| 2,989,755 | 6/1961 | O'Brien et al. | 2—168 |
| 3,298,034 | 1/1967 | Szegvari | 2—168 |

EARL M. BERGERT, *Primary Examiner.*

CLIFTON B. COSBY, *Assistant Examiner.*